D. W. JACOBY.
Seed-Planter.
No. 68,201.
Patented Aug. 27, 1867.
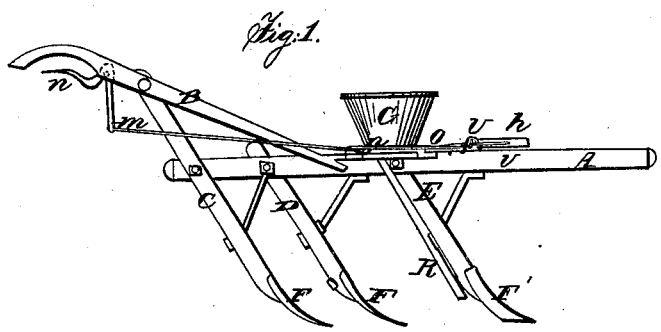
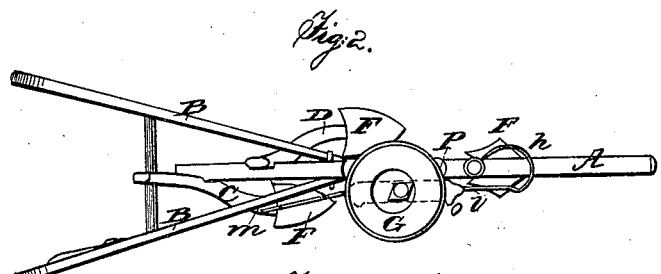
Witnesses
Albert R Thompson
J. J. Mouser
Inventor
D W Jacoby
By his attorney,
Geo. F. Chapin

United States Patent Office.

D. W. JACOBY, OF SHELBYVILLE, ILLINOIS.

Letters Patent No. 68,201, dated August 27, 1867.

IMPROVEMENT IN COMBINED CORN-PLANTER AND CULTIVATOR.

*The Schedule referred to in these Letters Patent and making part of the same.*

TO ALL WHOM IT MAY CONCERN:

Be it known that I, D. W. JACOBY, of Shelbyville, in the county of Shelby, and State of Illinois, have invented a Combined Corn-Planter and Cultivator; and I do hereby declare that the following is a full, clear, and exact description of the construction and operation of the same, reference being had to the accompanying drawings and letters marked thereon, making a part of this description, in which—

Figure 1 is an elevation of my invention.

Figure 2, a plan view of the same.

Figure 3, a section of the dropping apparatus.

The nature of my invention, practically, consists in the use of a common plough-beam, to which is attached a metallic dropping apparatus arranged by means of a slide, spring, and levers, the latter being placed in a convenient position for the operator to drop corn or similar grain in hills forming rows of any given distance apart, and in combination with the above a pipe, of iron, leading from the dropping-hopper downward to a suitable point low enough to convey seed into a furrow made by the marking-shovel, which is attached to a standard curved inward, so that the marking-shovel is directly under the centre of the beam. Said standard is attached to the side of the beam with bolts, the object being to retain the full strength of the beam; and further, in attaching curved standards to a single beam and extending their lower ends outward far enough to support the rear shovels in a suitable position for covering the seed and stirring the ground.

In order to give a correct understanding of my invention, I have marked corresponding parts with similar letters, and will now give a detailed description.

A represents the common plough-beam, to which my devices are attached, and B B the handles, by means of which the plough is guided. E represents the forward standard, in the rear of which is arranged a pipe, R, for conveying seed to the furrow made by a shovel attached to said standard. A metallic plate, P, is attached to beam A, and has a mortise made horizontally through it suitable to allow a plate, O, to have a reciprocating motion, and also an opening, S, fig. 3, of suitable size, and corresponding with a similar opening in the sliding-plate O for holding the quantity of grain to plant a hill. A rod, v, figs. 1 and 2, is attached to a spring, h, and to the front end of plate O, and a rod, m, is attached to the rear end of said plate and passes back to a point near the end of the right handle B, and is secured to crooked lever n, attached to said handle, in a convenient position for being grasped with the hand which holds the handle and forced upward so as to open or bring the hole in plate O over the pipe R, which will cause the corn to fall to the ground directly in the rear of marking-shovel F′ and then covered by shovels F F. It will be seen from this description that if the hand is made to force the crooked part of lever n upward it will draw on rod m and open the slide O, and thus allow corn to fall down, and that as soon as the hand is released the spring h will carry the plate back to its original position, and that the distance which the rows are to be apart can be controlled by the pressure of the hand. A hopper, G, is attached to the top of plate P, and is of convenient size to hold corn enough to plant one or more rows, as the case may require. D C show curved standards attached near the rear end of the beam, and arranged to support shovels for covering corn and cultivating the ground.

Operation.

There need be no change in the device whether cultivating or planting, and the only difference in operating it consists in not using the crooked lever n when not planting.

As a whole, my invention will be found simple, cheap, and very convenient for planting and cultivating corn and stirring the ground under any circumstances which may be required, and perform the work in a superior manner.

Having thus fully described my invention, what I claim, and desire to secure by Letters Patent of the United States, is—

1. The stationary plate P, substantially as described.

2. The combination of the stationary plate P, having a mortise or groove, in which a slide-plate, O, is made to operate by means of a spring, h, rods v m, and crooked lever n, in combination with pipe R, substantially as set forth.

3. The combination of the shovels F′ F, pipe R, plates O P, spring h, lever n, rods m v, arranged to operate substantially as and for the purpose set forth.

D. W. JACOBY.

Witnesses:
ALBERT R. THORNTON,
I. J. MOUSER.